Oct. 10, 1967  E. R. LIEBERMAN  3,346,402
METHOD OF PRODUCING AN EDIBLE, TUBULAR
COLLAGEN-GELATIN SAUSAGE CASING
Filed June 17, 1964  4 Sheets-Sheet 1

INVENTOR.
EMANUEL R. LIEBERMAN
BY
Robert W. Kell
ATTORNEY

Oct. 10, 1967  E. R. LIEBERMAN  3,346,402
METHOD OF PRODUCING AN EDIBLE, TUBULAR
COLLAGEN-GELATIN SAUSAGE CASING
Filed June 17, 1964  4 Sheets-Sheet 4

INVENTOR.
EMANUEL R. LIEBERMAN
BY
Robert W. Kell
ATTORNEY 3,346,402
METHOD OF PRODUCING AN EDIBLE, TUBULAR COLLAGEN-GELATIN SAUSAGE CASING
Emanuel R. Lieberman, Somerville, N.J., assignor to Johnson & Johnson, a corporation of New Jersey
Filed June 17, 1964, Ser. No. 375,905
2 Claims. (Cl. 99—176)

ABSTRACT OF THE DISCLOSURE

The specification describes the extrusion of a homogeneous mixture of 80 to 95 parts of swollen, tendon collagen fibrils and 5 to 20 parts of gelatin into an ammonium sulfate solution to form a continuous tube, which is coagulated, tanned, plasticized, and dried to a moisture content of 10–30 percent. The extruded tendon collagen-gelatin product so obtained is edible and may be used as sausage casings.

---

This invention relates to new and useful methods for producing a collagen tube from tendon collagen by continuous extrusion and to edible casings derived therefrom. The product of the invention is particularly adapted to be utilized as an edible casing for sausages of the wiener or frankfurter type. Such sausages are generally processed by being smoked and cooked by the packer and are generally re-heated before they are consumed. When such sausages are provided with edible casings, it is unnecessary to remove the casing before the sausage is eaten.

Natural casings, i.e., those prepared from the intestines of animals such as cattle, swine and sheep, suffer from a number of disadvantages which limit their acceptance. Tender edible casings can be obtained from optimum quality sheep intestines but because of their rarity and difficulties involved in their preparation, such tender edible casings command a high price. Other casings from the cleaned intestines of animals are frequently tough and unpleasant to eat. This is generally true of casings made from hog and beef intestines, but is also frequently the case when made from sheep intestines. In addition, the thickness of the wall and diameter of natural casings will vary, causing difficulty during modern high speed stuffing.

In view of the obvious deficiencies of natural casings and the expense of preparing such casings for human consumption, many attempts have been made to prepare a better edible casing from other sources of collagen.

A method of manufacturing artificial collagen casings from fresh unlimed cowhide is described in U.S. Patent No. 3,123,653. Collagen from fresh hides is converted by mechanical disintegration and the swelling action of acids under controlled conditions into a fluid mass of swollen collagen fibrils which may be extruded to form a tube. Although such extruded tubular bodies are quite fragile, the cowhide collagen fibrils may be coagulated in a concentrated solution of ammonium sulfate to form a tube having sufficient tensile strength to permit hardening the coagulated tube, washing coagulant from the hardened tube and drying said tube in a continuous process.

Attempts to manufacture an artificial collagen casing by the method described in U.S. Patent No. 3,123,653, but substituting for the starting material a homogeneous mass of acid-swollen animal tendon or limed cowhide failed because the extruded tube falls apart and disintegrates in the coagulation bath. These experiments suggest that collagen derived from limed hides and animal tendon is unsuitable for use in the continuous extrusion of tubular casings. In spite of these disappointments, however, efforts were continued to utilize limed hides and tendon as a source of collagen for the manufacture of artificial casings.

Efforts were made to improve the extrusion characteristics of acid-swollen collagen derived from limed hides by adding thereto from about 5% to about 20% by weight of gelatin. The extrusion of this material produces an extremely fragile tubular body lacking in cohesive strength and difficulty is experienced in properly coagulating, hardening and handling the material during processing. During the initial coagulation with ammonium sulfate the extruded tubular body does not acquire the tangible form and integrity of its own, but remains weak, fragile and invariably breaks as it passes in the wet state through subsequent conditioning treatments.

It was noted that cohesion of tendon collagen could be greatly improved by coagulating the swollen collagen in a water-miscible organic solvent such as acetone, but the use of an organic solvent greatly increases the cost of the manufacturing process and the highly volatile solvent is a dangerous fire hazard. Moreover, the organic solvents may react with the acid-swollen collagen to form undesirable inedible by-products. Tendon casings prepared by extruding swollen tendon collagen into an acetone coagulating bath shrink extensively in cooking and cause the meat to extrude from the ends of the sausage.

It was also determined that finely divided tendon collagen treated at room temperature with an elastase, such as ficin, for about 5 to 24 hours prior to acid-swelling results in a collagen mass that may be extruded in the form of a tube into a coagulating bath. The collagen tube obtained under these conditions has sufficient tensile strength to permit hardening the coagulated tube, washing coagulant from the hardened tube, and drying said tube in a continuous process. Moreover, the artificial casing manufactured from enzyme-treated tendon collagen is sufficiently strong to withstand the stuffing and linking operation and produces a tender, edible sausage of excellent appearance. It is a disadvantage of artificial casings prepared from enzyme-treated tendon collagen, however, that they melt at elevated temperatures and do not survive the frying process.

In accordance with the present invention, it has now been discovered that the addition of specific amounts of gelatin to a fluid mass of swollen tendon collagen enables one to extrude the fluid mass into a coagulating bath containing an inorganic salt such as ammonium sulfate. The thin-walled tubular casing material formed by extrusion from such a relatively watery mass of swollen tendon and gelatin, when subjected to the post-treatments of the present invention will produce sausage casings which are very tender and so easy to masticate that in eating they can scarcely be distinguished from the sausage meat itself. Sausage casings that are prepared in accordance with the present invention have sufficient tensile strength and burst strength to be shirred, stuffed and linked using commercial equipment without undue rupture or stretching. Moreover, such casings have been found to survive the stresses and temperatures involved in cooking in the frying pan so that there is substantially no shrinkage, rupturing or melting of the casing or extrusion of the meat product therefrom during the cooking process.

The amount of gelatin present in the fluid mass of collagen may be varied from about 5% to about 20% by weight of the collagen solids. If less than 5% gelatin is present the coagulated tendon collagen, unlike unlimed cowhide fibrils, lacks the cohesive strength and tensile properties required when the thin-walled casing is subjected to the post-extrusion treatments. If more than 20% gelatin is present the extruded casing possesses sufficient strength to pass through the washing, hardening, drying and shirring treatments, but the final product is lacking in hot tensile strength. Preferably, a gelatin of high bloom strength, i.e. 250 to 400 is employed. It is an advantage to pass the fluid collagen-gelatin mass through a tube heated to 40° C.–55° C. prior to extrusion.

DEFINITIONS

For the sake of clarity and brevity, certain terms used in the specification and claims are defined as follows:

By the term "collagen fibril" is meant the structural unit of collagenous tissues made up of many thousands or even millions of tropocollagen units. The collagen fibril, as it is found in tendon is round in cross-section, measures in the completely dehydrated state about 500 to 2000 angstroms in diameter and is of indefinite length.

The term "swollen tendon collagen fibril" in the context of this application is the state assumed by tendon collagen fibrils after fragments of tendon have been mechanically reduced in size and the fibrils therein swollen in a weak acid solution. The diameter of the swollen tendon collagen fibrils ranges from less than 0.5 micron to a maximum diameter of about 9 microns.

The term "fluid mass of swollen collagen fibrils" is herein applied to such a mass after filtration and when ready for extrusion. In accordance with the present invention such a fluid mass of swollen collagen fibrils should contain from about 2.5% to about 6% of collagenous tissue on a dry-weight basis.

Typical casings of the present invention have the following illustrative properties when tested on an Instron tensile tester by the method described in U.S. Patent No. 3,123,482. Each casing sample is heated to 99° C. with live steam prior to testing.

The change of length due to shrinkage of a 3 inch sample of the casing heated to 99° C. with live steam amounts to from about 1.0 inch to about 2.0 inches.

The strain in inches per pound of stress is from about 2.0 to about 20.0 inch pounds.

The hot tensile strength is from about 0.10 pound to about 1.00 pound.

The shrink tension is from about 0.08 pound to about 0.50 pound.

The percentage recovery (length of the casing at the break point divided by original length of sample being tested times 100) amounts to from about 80 to about 150.

The burst strength is at least about 10 to 28 pounds per square inch. "Burst strength" is the air pressure in pounds per square inch required to burst dry extruded collagen casing having a wall thickness of 1 mil. The values of "burst strength" expressed in this specification were determined on a Perkins Mullen tester (model C). Fluid under uniformly increasing pressure expands against a distensible rubber diaphragm and, simultaneously, into a Bourdon pressure gauge. The material to be tested is clamped securely to a metal plate through which the diaphragm is free to expand through a circular opening against one square inch of its surface. As the sample distorts under pressure, the diaphragm assumes the exact contour of the material, uniformly distributes the pressure over the entire test area, and protrudes into any imperfection or weak section to burst or rupture it at that point. When the pressure drops at the moment of rupture, the gauge registers the maximum pressure reached to indicate the exact pressure at the time the bursting occurred.

OBJECTS

It is an object of the present invention to extrude into an aqueous salt bath a casing of tendon collagen fibrils that may be washed, hardened and shirred on modern high-speed machinery.

Another object of this invention is to produce strong thin-walled casings from tendon collagen which, when stuffed with sausage emulsion, are edible after cooking; which do not burst, rupture or melt under the stress and temperatures of cooking; and which do not shrink or extrude emulsion during cooking.

It will be understood that the foregoing general description and the following detailed description as well are exemplary and explanatory but are not restrictive of the invention.

DRAWINGS

The process for the manufacture of extruded collagen articles of the present invention may be more fully understood from the following detailed description and examples taken in connection with the accompanying drawings wherein.

Figure 1:
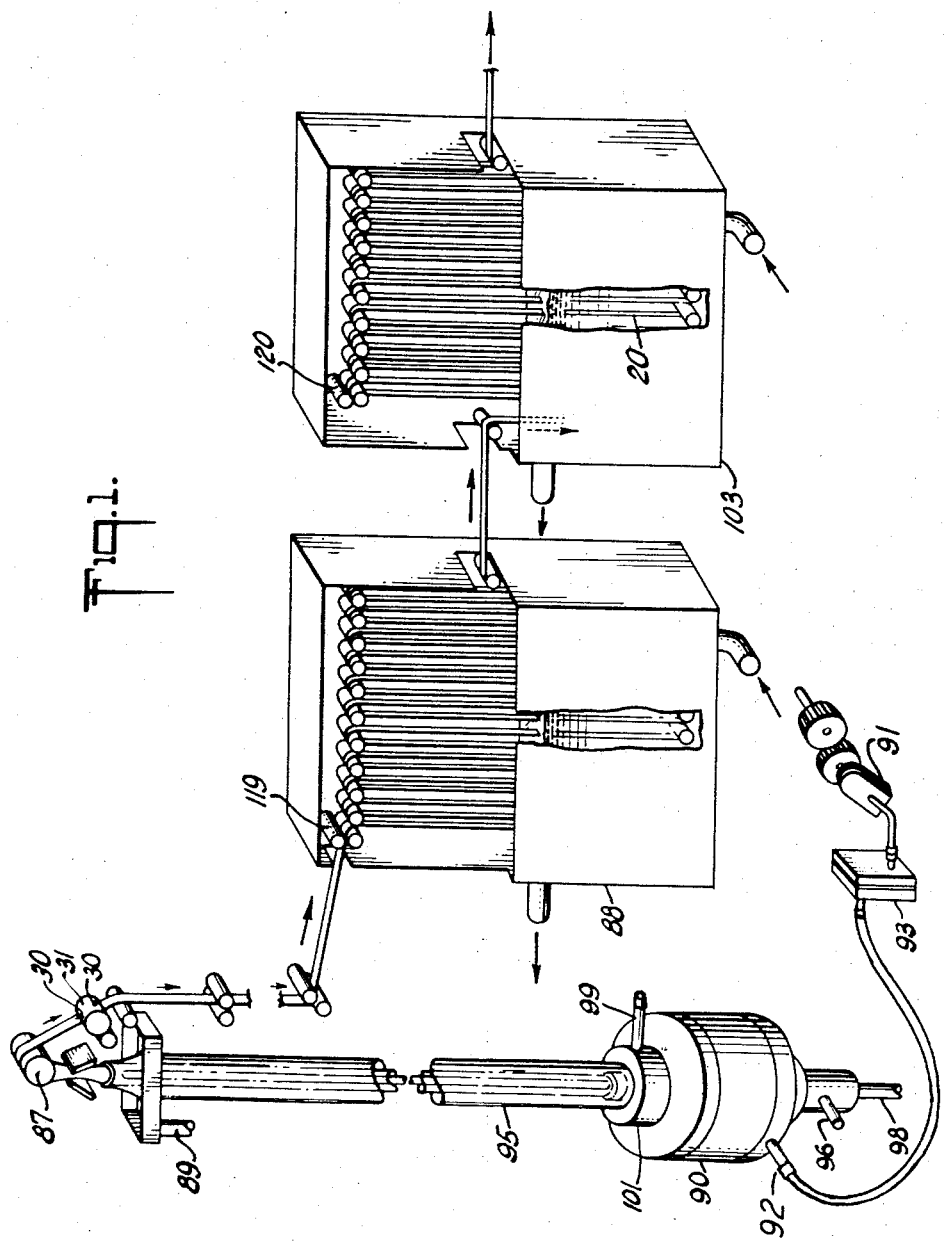
FIGURES 1 and 2 are flow diagrams illustrating the sequence of steps in the continuous manufacture of a collagen casing in accordance with the present invention.

Throughout the specification and examples that follow, all quantities are expressed in parts by weight unless otherwise indicated.

Example I

Bovine tendon (the deep flexor tendon), received from the packing house in the frozen condition, is thawed to permit cleaning the tendon of fat, non-collagenous protein, and other extraneous matter. The cleaned tendon is then frozen in bundles and sliced to a thickness of 15 mils.

An aqueous solution of gelatin is prepared by dissolving 7.4 parts of gelatin (bloom strength 300) in 1000 parts of water heated to 55° C. To this gelatin solution with stirring is added 247 parts of the tendon slices which analyze 30% by weight dry collagen solids and 70% by weight moisture. This slurry (100 parts) is then treated with 100 parts of a 0.74% solution of gelatin in water containing 2.4% lactic acid using an inline mixer to form a homogeneous mass of swollen collagen fibrils and gelatin. The mixture so obtained contains 3.7% tendon collagen solids, 0.74% gelatin and 1.2% lactic acid. After the pulp is blended with acid, the mass of swollen collagen fibrils is further dispersed in a suitable homogenizer, fitted with a 2-stage valve and operated with a 1500 p.s.i. drop per stage.

Other mixtures prepared in similar manner may contain tendon solids (in the above-described form of swollen collagen fibrils) as low as about 2.5%, the preferred concentration of tendon solids being about 4%. If the collagen concentration is less than 2.5%, coagulation after extrusion becomes very difficult, while a concentration of collagen exceeding 6% requires very high extrusion pressures due to increased viscosity. The preferred concentration of lactic acid is about 1.2% but may be as low as about 0.50%. The preferred concentration of gelatin is about 20% of the collagen solids present, but may be as low as 5%, and will depend upon the bloom strength of the gelatin used. If the bloom strength of the gelatin is too low some of it will dissolve in the ammonium sulfate coagulation bath.

The fluids mass of swollen collagen fibrils obtained as described above is filtered through a 7-mil filter screen to remove unswollen collagen and non-collagenous materials, and then extruded in the form of a tube, in such a way as to impart some collagen fibril orientation transverse to the extrusion direction. The particular design and operation of the extruder constitutes no essential part of the present invention, but it has been found preferable to utilize the action of the extruder to effect the maximum homogeneity of fibril distribution so as to impart substantial burst strength and transverse tear strength to the tube and ultimate casing while also effecting orientation or alignment of fibrils or masses of fibrils in the direction of extrusion, particularly those adjacent the tube walls, thereby to achieve substantial longitudinal or tensile strength as well. One form of extruder found useful in practicing the invention is disclosed in U.S. Patent No. 3,122,788.

Figure 3:
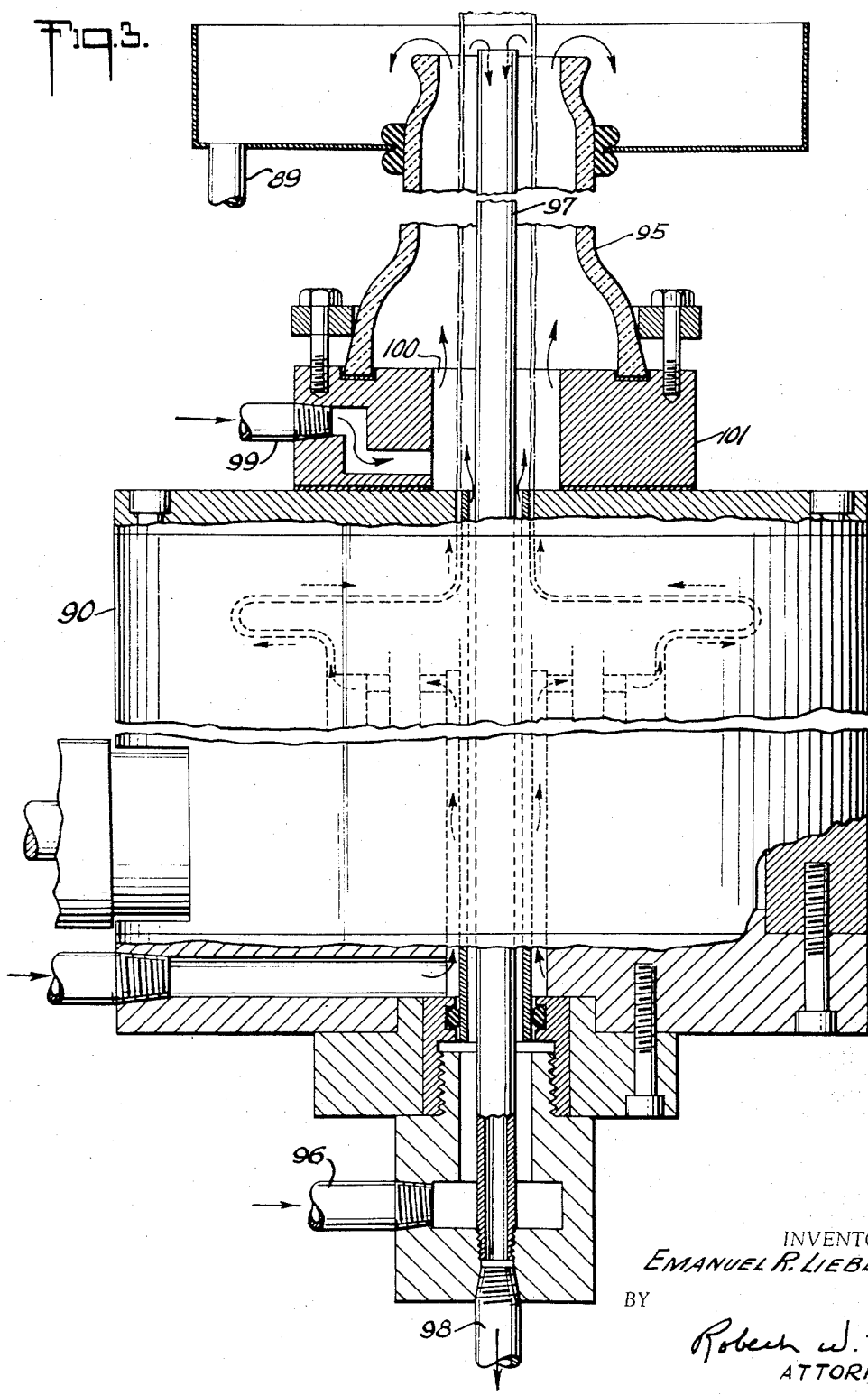
FIG. 3 is a vertical sectional view illustrating the flow of the dehydrating bath and collagen through an extruder.

With reference to FIGS. 1 and 3 the extruded fluid mass of swollen collagen fibrils and gelatin leaves the orifice of the extruder 90 in the form of a tubular body of watery fluid travelling upwardly into a dehydrating or coagulating bath which surrounds the orifice of the extruder and extends upwardly therefrom. The initial coagulating bath into which the extruded tubular body immediately passes is in the form of a vertical column of liquid constituting a housing 95 surrounding and extending upwardly from the extruder orifice. A portion of this liquid flows upwardly within the extruded tubular body, passing between the extruded body and an internally disposed over-flow or return tube 97. The flow rate within the extruded body is quite slow, to avoid pressures and velocities harmful to the delicate extruded body, and may be, e.g., about 1 gallon per hour. Another portion of the coagulating liquid flows upwardly in the housing outside the extruded tubular body and returns through an external overflow drain 89 for recirculation. The flow rate of said outside column of liquid may be relatively rapid, e.g., about 2 gallons per minute. Thus in the inside and outside of the tubular body are initially bathed in upwardly flowing columns of a coagulating liquid.

It should be noted that the density of the extruded tubular body as it comes from the extruder orifice is substantially less than that of the coagulating salt solution into which it passes. Accordingly the tendency of the extruded tubular body is to rise and travel naturally upwardly in the coagulating liquid. This phenomenon facilitates the starting up of the extruder and the maintenance of the desired upward travel of the tubular body with the exertion of a minimum of external forces thereupon. This action occurs at that stage in the treatment of the tubular body when it is weakest and most fragile and possesses virtually no integrity of its own.

After reaching the top of the liquid housing, the tubular body is passed into and through a bath 88 of the coagulating liquid for a total coagulating exposure of about 6 minutes, although this time may be as short as about 3 minutes. This coagulating treatment is the first conditioning step applied after extrusion of the tubular body. The coagulating bath 88 is an aqueous ammonium sulfate solution containing about 40% ammonium sulfate adjusted to a pH substantially higher than that of the acid-swollen collagen material, e.g., a pH of about 7.0 with some suitable alkaline material such as sodium or ammonium hydroxide. The coagulating liquids in the verticle housing above the extruder and in said bath 88 are of the same aforesaid composition. The purpose served by these coagulating baths is primarily to replace the water in the extruded tubular body by ammonium sulfate solution, thereby coagulating and giving temporary form and integrity to the tubular body so that it may be handled in the subsequent conditioning operations.

The tubular body when it passes from the extrusion nozzle or orifice, has a wall thickness determined by the annular space between the internal and external extruder tubes forming the orifice. In a preferred embodiment of the invention the external diameter of the inner extrusion tube is about .75″ while the radial distance between the exterior of said inner tube and the interior wall of the external tube is about .014″. Thus the tubular body referred to will have an initial wall thickness of about .014″ (14 mils) and this thickness will be substantially maintained throughout most of the liquid conditioning treatments as hereinafter described. Ultimately, in accordance with the invention, the dried tubular body will be reduced to a wall thickness of the order of .001″ (1 mil), but the initial inner diameter of about .75″ will be preserved. These dimensions are given by way of example and are not limiting, but do illustrate the relatively great reduction in wall thickness required and achieved to practice of the invention. The casing diameter of about .75″ is typical of casings used for fresh pork sausages.

As a second conditioning step the concentration of coagulating salt in the coagulated tubular body is substantially reduced, thereby to facilitate the hardening action hereinafter described. In the preferred embodiment of the invention, hardening is effected by treatment with alum and it has been found that such treatment is effective only when the concentration of ammonium sulfate in the tubular body has been substantially reduced, yet a sufficient amount thereof retained pro tem to avoid undue softening and weakening of the coagulated tubular body. Accordingly the tubular body is pre-washed for a period of about six minutes in the tank 103 which contains a much diluted water solution of ammonium sulfate (e.g., about 4% to 18%) similarly adjusted to pH of about 6.5.

Figure 2:
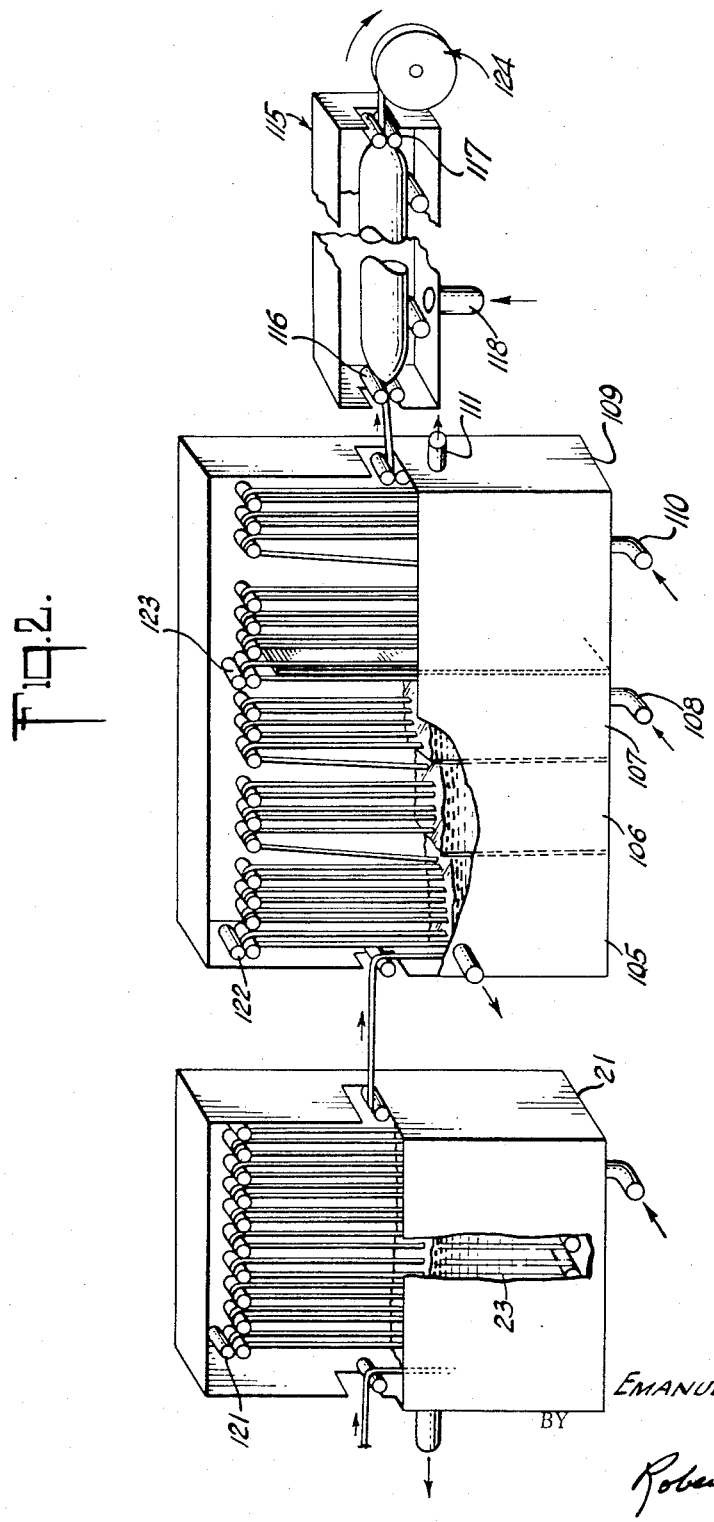

In accordance with the invention and referring now to FIG. 2, a third conditioning step constitutes a hardening of the coagulated casing by reaction of the collagen therein to alum. For this purpose the pre-washed coagulated tubular body is immersed in the tank 21 and treated with a solution 23 containing, e.g., about 6% alum

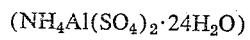

1% citric acid and 4% ammonium sulfate. The contact time is about six minutes and this alum hardening solution is maintained at pH 4.3.

This hardening treatment is sometimes called "tanning," but the primary purpose is to effect a hardening of the casing so as to make it resistant to water, which is not the case with collagen coagulated with ammonium sulfate. Without such hardening action the application of water to the tubular body coagulated with ammonium sulfate would reduce it to a formless gel. In other words the coagulation with ammonium sulfate is essentially a temporary step after which a more permanent hardening action is effected by treatment with alum. More detailed descriptions of the alum treatment with various examples thereof are given in U.S. Patent No. 3,123,481.

The fourth conditioning step, in accordance with the invention, involves removal of the ammonium sulfate salt which has remained in the tubular body after the pre-wash and alum hardening steps. This excess ammonium sulfate as well as any excess alum in tubular body are removed in tanks 105, 106 and 107 by a prolonged washing of the tubular body in tap water, e.g., for about twenty minutes.

The fifth step in the conditioning of the tubular body is called a plasticizing operation. This procedure involves essentially two steps, one of which is the application of a humectant such as glycerine which preserves the softness of the material after drying and helps in rehumidifying it. This plasticizing material also prevents cracking and other effects consequent upon undue drying. As an example, the plasticizing bath 109 may contain 3.6% glycerol, 20 parts per million formaldehyde and 0.1% sodium bicarbonate. The dwell time in this bath is about five minutes.

Concomitantly with the plasticizing step, carboxymethyl-cellulose (CMC) is preferably included in the plasticizing bath and applied thereby to the tubular body. For this purpose, about 0.33% CMC is added to the bath and the glycerol concentration is preferably increased to about 4.8%. A more detailed description of the composition of this combined plasticizing and CMC bath and variations thereof are given in U.S. Patent No. 3,123,483. The application of CMC has the effect of partially drawing out water from the tubular body and thereby reducing its thickness. In the example here given, the thickness reduction is from the original 14 mils to about 10 mils. Moreover as described in U.S. Patent No. 3,123,483, the application of CMC improves the wet-strength of the casing before drying because of the proportionate increase in solid content. Moreover, it increases the burst-strength of the ultimate casing, thereby improving its properties during stuffing and cooking.

As the next or sixth conditioning step in the method, the hardened, plasticized and partially solidified tubular body is dried by hot air currents. For this purpose the casing is passed through a drying chamber and subjected therein to heated currents of air in the form of jets directed at the exterior thereof while maintaining the drying body in the form of a tube by inflation with air under pressure. This drying air is at approximately 80° C. and 8% relative humidity and the casing is subjected to such treatment until the wall thickness of the tubular body has been reduced to about 1 mil in the example under discussion. Great care is taken during this step to prevent expansion or stretching of the air-inflated casing beyond the internal diameter imparted to it by the extrusion, e.g., 0.75 inch in the example given. The achievement of suitable drying can be determined by visual inspection, the dried casing tube being translucent, while the presence of moisture is indicated by a whitish, opaque color.

During the drying operation or immediately thereafter, an albumin powder may be blown into and through the inflated casing or otherwise applied, as more particularly described in U.S. Patent No. 3,123,480. Also after drying the dried tube may be partially rehumidified, by application of moist air, to avoid brittleness or cracking.

Figures 4, 5:
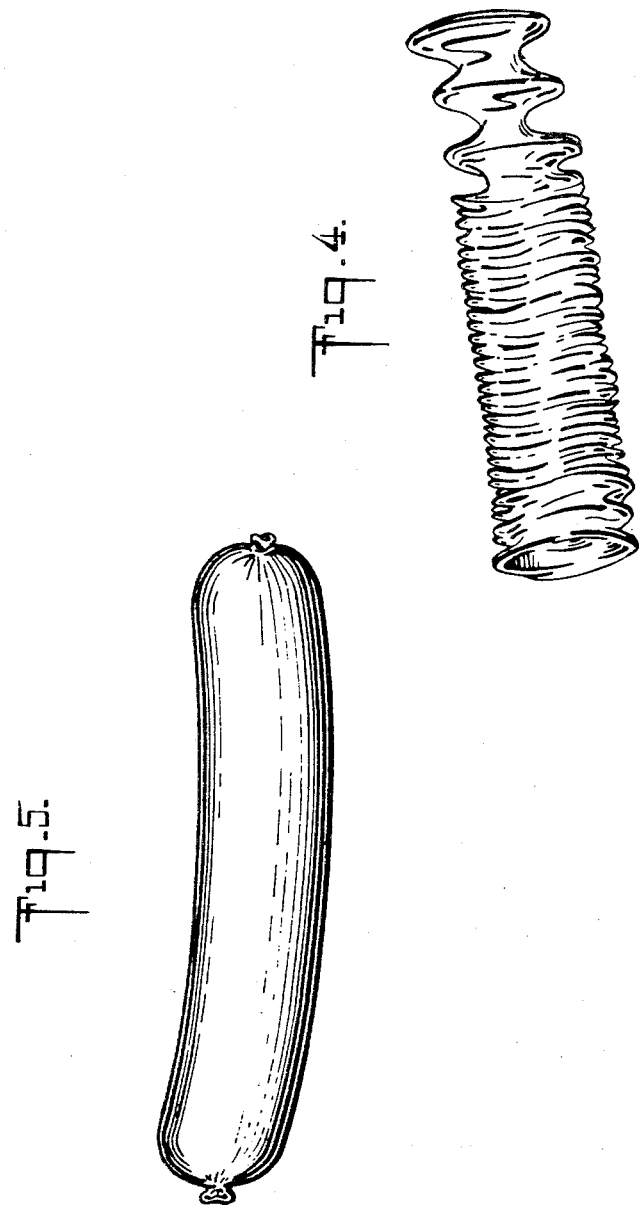
FIG. 4 illustrates the extruded collagen casing of the present invention in a shirred condition.
FIG. 5 illustrates an extruded casing of the present invention, stuffed with sausage.

The dried casing tube may then subjected to automatic shirring and shirred lengths severed to form casings of the type illustrated in FIG. 4 which are adapted to be stuffed on automatic stuffing machines. As a final step, prior to stuffing but after shirring, the casing is preferably subjected to a heat-curing treatment. This treatment comprises storage for about eight hours at a rising temperature bringing the casing material from room temperature to about 80° C. It is then maintained at 80° C. for some sixteen hours more, which completes the heat curing thereof.

While the moisture removal effected in the drying chamber described above may reduce the inherent moisture in the tubing to as low as about 20%, the ultimate moisture content after heat curing is preferably in the range of 10% to 30% by weight, i.e., giving a solids content in the approximate range of 70% to 90%.

The heat curing described above has the effect of increasing the hot tensile-strength in stuffing. It it believed that this heat-curing operation accomplishes some cross-linking or so-called tanning. While said heat curing operation is preferred, the effect thereof may be substantially obtained alternatively by adding a small amount of formaldehyde (as little as 20 parts per million) in the hardening or plasticizing bath. Formaldehyde so applied has a tanning effect, but it has been found more difficult to control.

The casing after this heat curing step will contain from about 10% to about 30% by weight of moisture and will pick up additional moisture if allowed to equilibrate at room temperature and humidity. Such casings will stuff satisfactorily if equilibrated at room temperature and a relative humidity of about 75%. To maintain the desired moisture content for stuffing, the so rehumidified casings are preferably packaged in hermetically sealed containers of metal foil or the like.

Collagen-gelatin casings prepared as described above have the following properties:

The change of length due to shrinkage of a 3 inch sample of the casing heated to 99° C. with live steam amounts to from about 1.0 inch to about 2.0 inches.

The strain in inches per pound of stress is from about 2.0 to about 20.0 inch pounds.

The hot tensile strength is from about 0.10 pound to about 1.00 pound.

The shrink tension is from about 0.08 pound to about 0.50 pound.

The percentage recovery (length of the casing at the break point divided by original length of sample being tested times 100) amounts to from about 81 to about 150.

The burst strength is at least about 10 to 28 pounds per square inch.

*Example II*

Beef tendon (deep flexor tendon), is received from the packing house in frozen condition to prevent deterioration and is thawed to permit cleaning the tendon of fat, non-collagenous protein and other extraneous matter. The cleaned tendon is then frozen in bundles resembling stacks of cordwood and sliced to a thickness of about 20 mils. Preferably, the tendon is sliced across the major axis as lengthwise slicing seems to result in slower swelling.

These tendon slices are diluted with 1000 parts of tap water at 16° C. to give slurry containing 7.4% dry collagen solids. This slurry (125 parts) is then treated with 125 parts of an aqueous 2.4% lactic acid solution containing 0.231 part gelatin (300 bloom) using an inline mixer to form a homogeneous mass of swollen collagen fibrils. The mixture so obtained contains 3.7% tendon collagen solids, 1.2% lactic acid, and 5% gelatin (based on collagen solids). After the collagen-gelatin and acid are blended in the inline mixer the mass of swollen collagen fibrils is further dispersed in a suitable homogenizer fitted with a 2-stage valve and operated with a 1500 p.s.i. drop per stage. The swollen collagen fibril-gelatin mixture is then heated to 55° C. for 2 minutes by pumping it under pressure through a stainless steel tube that is heated to that temperature. The heat-treated material is next filtered through a 7-mil filter screen to remove non-swellable tissue fragments.

Referring to FIG. 1 it will be noted that a suitable metering pump 91 is employed to extrude the homogeneous mass of gelatin and swollen tendon collagen fibrils through screen filter 93 and the entry port 92 of extruder 90 into a coagulating bath circulating through a vertical column 95. The extrusion apparatus 90 used for the manufacture of the casings of the present example may be a disk extruder of the type illustrated in FIG. 3, which type of extruder is further described and claimed in U.S. Patent No. 3,122,788. Extruders of this type can produce a uniform and homogeneous casing in which the collagen fibrils are more or less randomly oriented but lie generally parallel to the surface of the tubular wall.

The coagulating bath is a 42% solution of technical grade ammonium sulfate in water. This strong salt solution causes the individual collagen fibrils in the extruded tube to lose water and become smaller in diameter so that they are no longer highly swollen. The pH of this bath is adjusted to about 7 with ammonium hydroxide and this coagulating bath and all baths employed throughout the process of the present example to treat the extruded casing are preferably maintained below 25° C.

It will be noted from FIGS. 1 and 3 that the swollen collagen fibrils are extruded into a coagulating bath recirculating in an enclosed system. The extruded tube is pulled vertically upward out of the bath by a driven roller 87, is perforated at 2 inch intervals by the needles 30 mounted on the rotating drum 31, and enters a coagulating bath of similar composition which is circulated through a tank 88.

The circulation of the coagulating bath through the vertical column 95 in contact with the inner and outer walls of the extruded collagen tube is best illustrated by FIG. 3. A portion of this bath enters the bottom of the extruder through a conduit 96 and flows vertically upward within the extruded tube passing between the extruded tube and an overflow tube 97. This liquid returns through the overflow tube 97, which extends to the top of the column, and an exit conduit 98. Another portion of the coagulating bath enters the bottom of the column 95 through a conduit 99 and an annular opening 100 in a distributor 101 that is fixed to the extruder 90. This portion of the dehydrating bath flows vertically upward in the column outside the extruded tube and returns through an overflow drain 89. The flow rate within the extruded tube (through conduit 96) is about 1 gallon per hour. This inside flow of the dehydrating liquid is most helpful when starting up the extruder. The flow rate outside of the extruded tube (through conduit 99) is about 2 gallons per minute.

Referring again to FIG. 1 the driven roller 87 transports the extruded tube through the column 95, whose length is such as to maintain the casing in contact with the bath for about a minute or less. The extruded tube is then perforated and enters in after-bath in tank 88 containing concentrated ammonium sulfate solution from which it emerges after deswelling is substantially completed, e.g., after about 5 minutes.

The collagen tube next enters a more dilute solution 20 of ammonium sulfate contained in the tank 103. Solution 20 is approximately neutral and contains from about 4 to 10% ammonium sulfate. The dwell time in this tank is about 6 minutes, during which time the concentration of salt solution that is present in the wet collagen tube is reduced to a value corresponding to the concentration of ammonium sulfate in solution 20. It is necessary to reduce the amount of salt that is present in the tube since the alum solution that is subsequently used to harden the collagen tube will not react with the collagen fibrils in the presence of excessive amounts of ammonium sulfate.

Referring now to FIG. 2, the collagen tube prior to final washnig is hardened in tank 21 which contains an alum hardening bath 23. This bath 23 is a solution of about 12% alum ($NH_4Al(SA_4O)$), about 8% ammonium sulfate and about 2.8% citric acid adjusted to pH 4.3. The dwell time of this casing in this alum hardening bath is 6 minutes.

Washing takes place in tanks 105, 106, and 107 which are separated by side walls of decreasing height. Thus, fresh wash water enters the tank 107 through a conduit 108 and overflows into tank 106 and tank 105. The total washing time is about 14 minutes, which time is sufficient to substantially remove from the collagen tube the soluble components. The washed tube then passes into a bath 109, containing a plasticizing agent such as about 6% glycerine in water. The dwell time in this bath is about 5 minutes. The plasticizing bath enters tank 109 through the conduit 110 and overflows through conduit 111.

The excess water is removed from the tube as it travels through the chamber 115. A section of the tube which is within the drying chamber, between rollers 116 and 117, is maintained in an inflated condition with a captive air bubble and forced warm air, e.g., at a temperature of about 60–70° C. enters the drying chamber through conduit 118. The dwell time in the drier 115 is about 9 minutes.

The extruded tube is conveyed through the system by driven rollers 87, 119, 120, 121, 122, 123, 116 and 117 and is collected on the take-up reel 124 or the take-up reel may be replaced with shirring apparatus which shirrs the casing as it leaves the drying chamber.

The casing is subjected to further heat treatment at about 80° C. and about 20–30% relative humidity for about 24 hours. This additional heat-curing step may be eliminated if a small amount of formaldehyde (as little as 20 parts per million) is added to the hardening or plasticizing bath.

The casing, after the heat-curing step, is stored in a constant temperature and constant humidity room until the moisture content of the casing is between 10% and 30% by weight. Such casings will stuff satisfactorily if equilibrated at a room temperature and a relative humidity of about 75%. To maintain the desired moisture content for stuffing, the so-rehumidified casings are packaged in hermetically sealed containers of metal foil or the like.

Casings made by the mthod described above are of uniform diameter and wall thickness. The casing wall is a smooth continuous film of tendon collagen fibrils encapsulated in a matrix of gelatin. The collagen fibrils that make up the casing wall cohere to form a membrane having the glass-like quality of a hyaloid membrane, but unlike the hyaloid membrane which is transparent, the collagen membrane is translucent. Throughout the casing wall the collagen fibrils lie in a plane that is parallel to the surface of the casing. The cohered collagen fibrils may be either randomly oriented or directionally oriented with respect to the direction of extrusion, depending upon the conditions of extrusion and the extruder used.

Typical casings made by the process described above were tested on an Instron tensile tester under the conditions described in U.S. Patent No. 3,123,482 and determined to have the following physical properties:

The change of length due to shrinkage $\Delta L$ is 1.53 inches;

The strain in inches per pound of stress, $e$, is 8.50 inch pounds;

The hot tensile strength is 0.5 pound;

The percent recovery is 92; and

The burst strength of this casing is 30 pounds per square inch.

As indicated above, it is important that the diameter of the extruded tendon collagen-gelatin casing be maintained uniform throughout all of the processing steps from the time it is extruded until it is shirred, heat-cured and packaged. Controlling the diameter of the casing is particularly critical during the drying step and this may be accomplished by varying the air pressure within the casing in response to a sensing device that continuously measures the diameter of the casing.

*Example III*

Salted tendon (12,290 parts) is ground through a ¾ inch meat grinder plate. The tendon is transferred to a washing apparatus and given fifteen changes of water over a 1½ hour period, with constant agitation. This process reduces the salt content to below 1%.

The washed tendon is then put through a meat grinder using a ⅜ inch and finally a 5/64 inch plate. The resulting material contains 3962 parts of dry tendon solids. Five percent of this quantity (198 parts) of gelatin is added by dissolving in water (20,000 parts) and mixing with the finely ground tendon.

Swelling is accomplished by adding 990 parts of 88% lactic acid in water (55,190 parts) to the tendon-gelatin-water mixture. The resulting mixture has the following composition:

| | Parts |
|---|---|
| Water | 75,190 |
| Lactic acid (88%) | 990 |
| Ground tendon (dry solids) | 3,962 |
| Gelatin | 198 |

After swelling for 3½ hours the mixture is further blended by one pass through the meat grinder using a ⅜ inch plate. Seven hours after the acid is added, the mass is homogenized and the homogenized material is collected in an evacuated vessel to remove air bubbles.

The following day the collagen mass is passed through a cylindrical filter having slits approximately 10 x 100 mils in size. It is then pumped through a coil maintained at 55° C. in a constant temperature bath. The total residence time of the collagen within the heated coil is 1½ minutes. After passing through the heated coil, the collagen mass is cooled and extruded in the form of a tube at a speed of 12.5 ft./min. into a 40% ammonium sulfate solution adjusted to pH 4.7 with ammonium hydroxide.

The casing is treated for 10 minutes in an aqueous solution containing 6% ammonium sulfate, 4% ammonium alum and 1% citric acid. The casing is then washed for 30 minutes in running water to remove excess salts.

The casing is then treated for 2 minutes with a plasticizing solution containing 4% glycerol and 1.5% low viscosity carboxymethyl cellulose (C.M.C.). The casing from the plasticizing solution is dried while inflated in a current of warm air. This air-dried casing is 1.1 mil in thickness. One sample is heat-treated at 104° C. for 30 minutes. The other sample is used without further treatment.

Both casing samples survive cooking and have tensile strengths (after heat-shrinking) of 0.2 to 0.5 lb. The tension exerted during shrinkage does not exceed 0.12 lb.

*Example IV*

Six thousand eight hundred and fifty parts of cleaned tendon are ground through the 18 mm. and then the 8 mm. diameter holes of a meat grinder. The tendon is then washed with constant agitation and 15 changes of water over a 1½ hour period. The dry solids content of the tendon at this stage is 1,979 parts. The ground tendon is mixed with water, acid and gelatin to form the following composition:

|  | Parts |
|---|---|
| Water | 52,562 |
| Lactic acid (88%) | 494 |
| Tendon (dry solids) | 1,979 |
| Gelatin (300 Bloom Number) | 400 |
| Dialdehyde starch | 20 |

The mixture is allowed to swell for 3½ hours and then passed through the meat grinder using an 8 mm. plate to further blend the material. Homogenization is carried out on the following day at 5000 p.s.i. The collagen mass is de-aerated by collecting it in an evacuated vessel.

The mixture is pumped through a filter having 8 x 140 mil slits and extruded in the form of a tube through an extruder of the type described in United States Patent No. 3,122,788. The extrusion velocity is 12 to 16 ft./min. The collagen tube from the extruder enters a coagulation bath containing 40% ammonium sulfate at pH 4.4.

The extruded and coagulated casing is further processed as follows:

(1) 2 minutes in 4% $(NH_4)_2SO_4$.
(2) 5 minutes in a tanning solution consisting of 6% $(NH_4)_2SO_4$, 4% alum, and 1% citric acid.
(3) 5 minutes in 1.0% sodium bicarbonate.
(4) 20 minutes water wash.
(5) 10 minutes in 4% glycerol.

The casing treated in this manner is then dried while inflated with a current of warm air and cured at 104° C. for 60 minutes. The casing is coated on the inside with an aqueous solution containing 20% egg albumin and 10% glycerol and then re-dried at 55° C.

The thickness of the casing so obtained is 0.7 mil. The burst strength of the dry casing, which has a satisfactory cooking response, is 31 pounds.

*Example V*

Tendon is treated as in Example IV above to produce a mass of swollen collagen fibrils having the following composition:

|  | Parts |
|---|---|
| Water | 44,903 |
| Lactic acid (88%) | 426 |
| Tendon (dry solids) | 1,708 |
| Gelatin (300 Bloom) | 340 |

Blending the mixture is accomplished by first dissolving the 340 parts of gelatin in 4,000 parts of warm water. The gelatin solution is then mixed with the remaining water and the lactic acid. This solution is then added to the wet tendon with stirring.

The mixture is homogenized at 5000 p.s.i. with simultaneous de-aeration in an evacuated vessel.

Extrusion is accomplished in the same manner as described in Example IV above.

The extruded casing from the initial 40% ammonium sulfate bath is treated for two minutes in 4% ammonium sulfate and then for 5 minutes in a tanning bath consisting of 6% ammonium sulfate, 4% alum and 1% citric acid. The casing is washed in water for 30 minutes and treated finally with an aqueous solution consisting of 10% glycerol, 20% egg albumin, 0.01% formaldehyde and 0.01% sodium bicarbonate. The casing is then dried as described in Example III above.

The dried casing is heated for 60 minutes at 104° C. and is then turned inside out so that in use the albumin coating will contact the meat and facilitate adhesion.

By the procedures described above, one may manufacture edible collagen casings from tendon, a by-product of the meat packing industry that is normally discarded. The invention in its broader aspects is not limited to the specific mechanisms shown and described, but departures may be made therefrom within the scope of the accompanying claims without departing from the principles of the invention and without sacrificing its chief advantages.

What is claimed is:

1. In a method of producing an edible, tubular collagen sausage casing by extruding a continuous fragile, tubular body from a fluid mass of acid-swollen tendon collagen fibrils into an aqueous ammonium sulfate solution; the improvement that comprises adding to the extrusion mass prior to extrusion, between about 5 percent and about 20 percent gelatin, based upon the weight of the dry collagen solids, whereby the extruded tubular body has sufficient strength to withstand the stresses applied during subsequent hardening, washing, and drying of said continuous tubular body.

2. The improvement defined in claim 1, wherein the extrusion mass is heated to 40–55° C. after addition of the gelatin.

References Cited

UNITED STATES PATENTS

| 1,158,400 | 10/1915 | Cohoe | 99—176 |
| 3,073,702 | 1/1963 | Keil et al. | 99—175 X |
| 3,123,482 | 3/1964 | Lieberman | 99—176 |
| 3,123,653 | 3/1964 | Lieberman | 99—176 X |
| 3,151,990 | 10/1964 | McKnight | 99—176 |

HYMAN LORD, *Primary Examiner.*

A. LOUIS MONACELL, *Examiner.*